(12) United States Patent
Hung et al.

(10) Patent No.: US 8,079,406 B2
(45) Date of Patent: *Dec. 20, 2011

(54) THERMAL MODULE

(75) Inventors: Jui-Wen Hung, Taipei Hsien (TW);
Ching-Bai Hwang, Taipei Hsien (TW);
Jie Zhang, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 1045 days.

This patent is subject to a terminal disclaimer.

(21) Appl. No.: 11/873,786

(22) Filed: Oct. 17, 2007

(65) Prior Publication Data

US 2009/0032219 A1 Feb. 5, 2009

(30) Foreign Application Priority Data

Aug. 3, 2007 (CN) .......................... 2007 1 0075537

(51) Int. Cl.
*H05K 7/20* (2006.01)
(52) U.S. Cl. .................................. 165/104.33; 361/700
(58) Field of Classification Search ............. 165/104.33; 361/700
See application file for complete search history.

(56) References Cited

U.S. PATENT DOCUMENTS

| 6,570,761 | B2* | 5/2003 | Stone et al. ............... 361/679.47 |
| 7,304,846 | B2* | 12/2007 | Wang et al. .................... 361/700 |
| 7,447,017 | B2* | 11/2008 | Koo .......................... 165/104.33 |
| 7,885,075 | B2* | 2/2011 | Li et al. ..................... 165/104.33 |
| 2004/0001316 | A1 | 1/2004 | Kamikawa et al. |
| 2005/0094379 | A1 | 5/2005 | Lee et al. |
| 2006/0077637 | A1* | 4/2006 | Ishikawa ....................... 361/703 |

FOREIGN PATENT DOCUMENTS

| CN | 2383134 Y | 6/2000 |
| TW | 581292 | 3/2004 |
| TW | M248229 | 10/2004 |
| TW | M306762 | 2/2007 |

* cited by examiner

*Primary Examiner* — Leonard R Leo
(74) *Attorney, Agent, or Firm* — Altis Law Group, Inc.

(57) ABSTRACT

A thermal module includes a centrifugal blower (10), a heat sink (20) mounted to an air outlet (11) of the centrifugal blower, a heat pipe (40) connecting the heat sink with a heat generating electronic component, and a resilient clip (80) for mounting the heat pipe onto the heat generating electronic component. The resilient clip includes an M-shaped pressing portion (82) disposed above an evaporation section (44) of the heat pipe, a plate portion (83) disposed at one end of the pressing portion for being fixed to a sidewall (53d), and an abutting portion (85) disposed at the other end of the pressing portion and including an abutting plate (85b) for abutting against a bottom surface of another sidewall (53b).

13 Claims, 5 Drawing Sheets

THERMAL MODULE

BACKGROUND OF THE INVENTION

1. Field of the Invention

The present invention relates generally to a resilient clip and a thermal module using the same.

2. Description of Related Art

It is well known that heat is generated during operations of a variety of electronic components, such as integrated circuit chips. To ensure normal and safe operations, cooling devices such as thermal modules are often employed to dissipate the generated heat away from these electronic components.

The thermal module includes a centrifugal blower, a heat sink arranged at an air outlet of the centrifugal blower, a heat pipe connecting the heat sink with an electronic component so as to transfer heat therebetween. In order to satisfy a good thermal contact between the heat pipe and the electronic component, a clip is often used to mount an evaporation section of the heat pipe onto the electronic component. US pat publication No. 20040001316 shows such a clip. However, the clip has a complicated structure, which increases cost of the clip and further disadvantages a mass production for the clip. Therefore, a clip, which has simple structure and lower cost is needed.

SUMMARY OF THE INVENTION

The present invention relates to a resilient clip and a thermal module using the same. The thermal module includes a centrifugal blower, a heat sink mounted to an air outlet of the centrifugal blower, a heat pipe connecting the heat sink with a heat generating electronic component, and a resilient clip for urging an evaporation section of the heat pipe toward the heat generating electronic component. The resilient clip includes an M-shaped pressing portion disposed above the evaporation section of the heat pipe, a plate portion disposed at one end of the pressing portion for being fixed to a top face of a first sidewall of a base plate, and an abutting portion disposed at the other end of the pressing portion and including an abutting plate for abutting against a bottom surface of a second side wall of the base plate.

Other advantages and novel features of the present invention will become more apparent from the following detailed description of first embodiments when taken in conjunction with the accompanying drawings, in which:

DETAILED DESCRIPTION OF THE INVENTION

Figure 1:
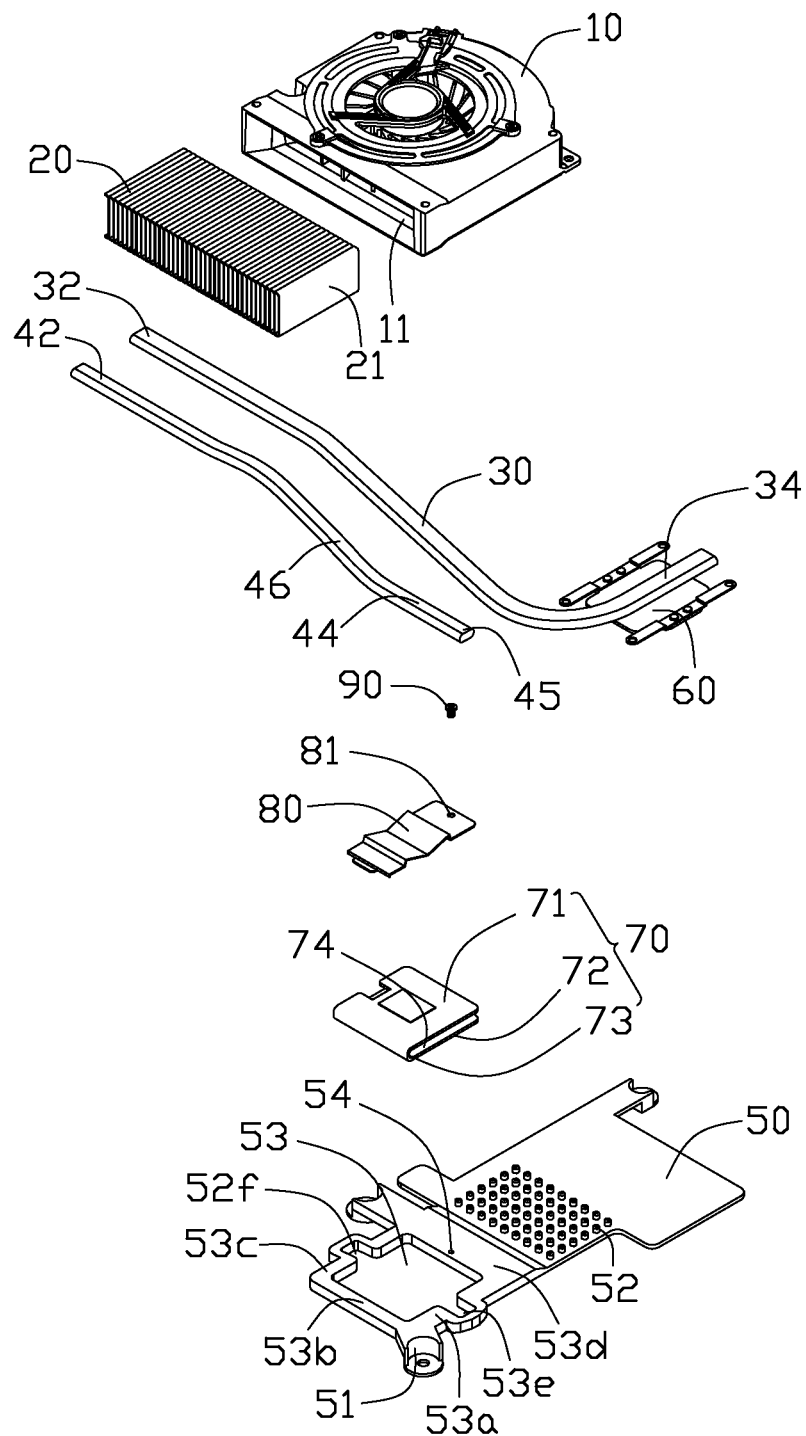
FIG. 1 is an exploded, isometric view of a thermal module in accordance with a preferred embodiment of the present invention.

Reference will now be made to the drawing figures to describe the first embodiment in detail.

Figure 2:
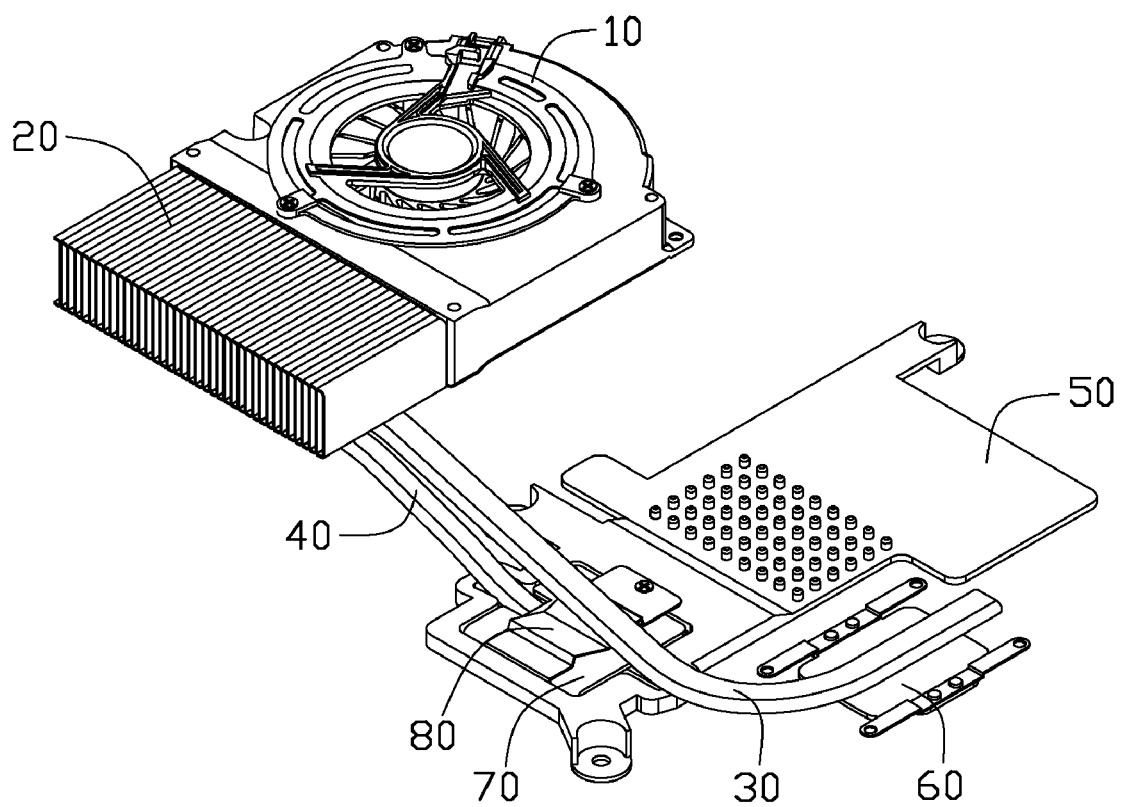
FIG. 2 is an assembled view of the thermal module of FIG. 1.

Referring to FIGS. 1 and 2, a thermal module in accordance with a preferred embodiment of the present invention is shown. The thermal module includes a centrifugal blower 10, a heat sink 20, two heat pipes 30, 40, a base plate 50, a heat absorbing block 60, a heat absorbing plate 70 and a resilient clip 80.

The heat sink 20 is mounted to an air outlet 11 of the centrifugal blower 10 and includes a plurality of stacked fins 21. The centrifugal blower 10 provides airflow flowing through the heat sink 20 so as to take away heat therefrom. The heat pipes 30, 40 respectively connect the heat absorbing block 60 and the heat absorbing plate 70 with the heat sink 20 so as to transfer heat therebetween. The heat absorbing block 60 and the heat absorbing plate 70 respectively connect with a CPU (central processing unit) and a VGA (video graphics array) card for absorbing heat therefrom. The heat pipe 30 is L-shaped in profile and has an evaporation section 34 contacting with the heat absorbing block 60 and a condensation section 32 contacting with a bottom surface of the heat sink 20. The heat pipe 40 is substantially linear shaped in profile and has an evaporation section 44 contacting with the heat absorbing plate 70 and a condensation section 42 contacting with the bottom surface of the heat sink 20. A portion of the heat pipe 40 is bent downwardly so that the evaporation section 44 of the heat pipe 40 is lower than the condensation section 42 thereof.

The base plate 50 is a die-casing part and has a substantially rectangular shape. Three legs 51 extend downwardly from a periphery of the base plate 50, which are devised for enabling the base plate 50 to be mounted to a printed circuit board (not shown). The legs 51 extend downwardly beyond a bottom surface of the base plate 50 a distance, whereby when the base plate 50 is mounted to the printed circuit board, a space is formed between the bottom surface of the base plate 50 and a top surface of the printed circuit board.

A plurality of heat dissipating posts 52 extend upwardly from a middle portion of the base plate 50, whilst a middle portion of the bottom surface of the base plate 50 contacts with a north bridge chip (not shown). The middle portion of the bottom surface of base plate 50 absorbs heat from the north bridge chip and dissipates the heat via the heat dissipating posts 52 and the other portion of the base plate 50.

The base plate 50 defines a substantially square accommodating space 53 at one side thereof, for receiving the heat absorbing plate 70 therein. The accommodating space 53 is enclosed by four sidewalls 53a, 53b, 53c, 53d. The opposite sidewalls 53a, 53c respectively define two notches 53e, 53f therein. The heat absorbing plate 70 is n-shaped in profile. The heat absorbing plate 70 includes parallel top and bottom plates 71, 72, and a side plate 73 integrally connecting the top plate 71 with the bottom plate 72. A receiving space 74 is enclosed by the top plate 71, the bottom plate 72 and the side plate 73, for receiving the evaporation section 44 of the heat pipe 40 therein. A free end 45 and a bent portion 46 of the heat pipe 40 are respectively received in the notches 53e, 53f of the base plate 50.

The sidewall 53d adjacent to the accommodating space 53 defines a mounting hole 54 in a top face thereof. The resilient clip 80 defines a through hole 81 in one end thereof, corresponding to the mounting hole 54 of the sidewall 53d. A fixing element 90 such as a screw or a rivet fits in the through hole 81 and the mounting hole 54 in that order, thereby fixing the end of the resilient clip 80 to the sidewall 53d of the base plate 50.

Figure 3:
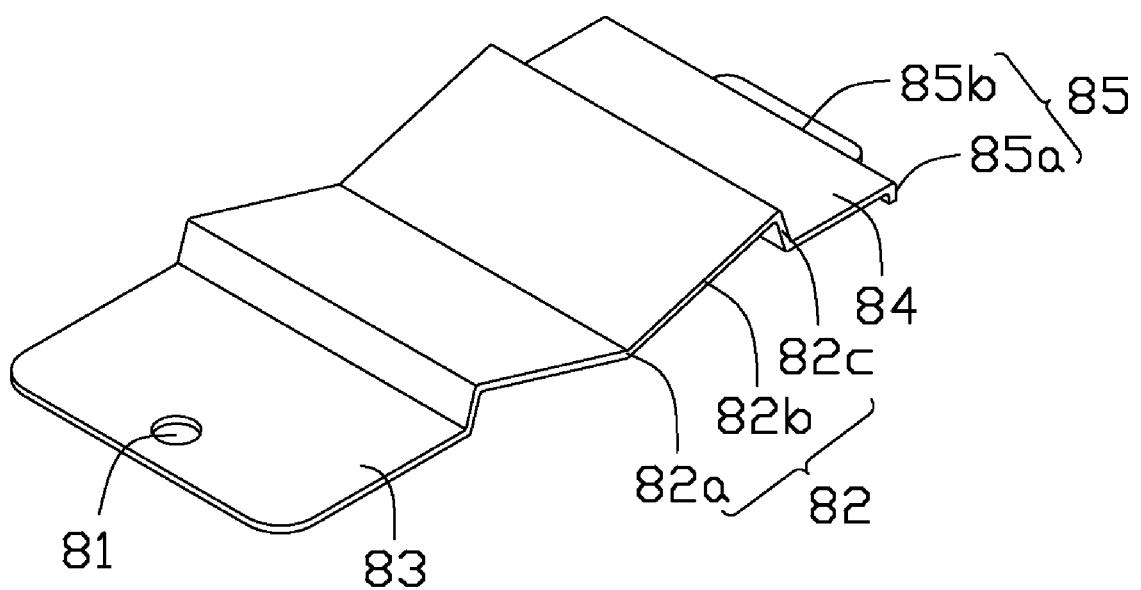
FIG. 3 is an isometric view of a resilient clip of the thermal module of FIG. 1.
Figure 4:
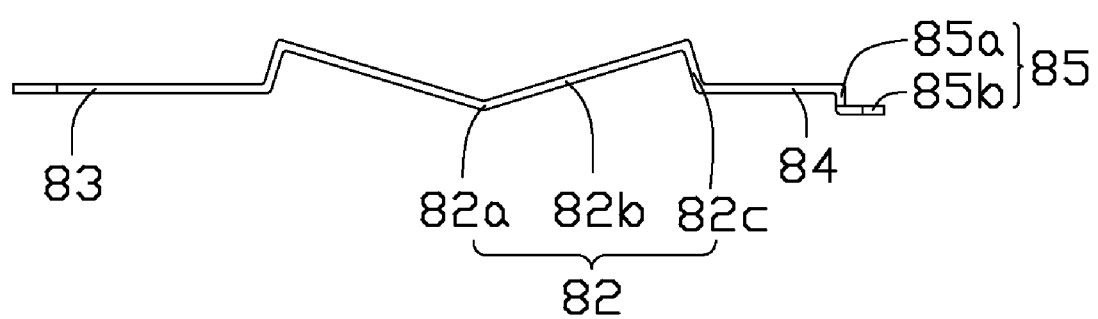
FIG. 4 is a side view of the resilient clip of FIG. 3.

Referring to FIGS. 3 and 4, the resilient clip 80 is made by stamping a flat, strip-like metal plate to obtain a continuously bent configuration. The resilient clip 80 includes a pressing portion 82 disposed at a middle portion thereof, first and second plates 83, 84 extending from two sides of the pressing portion 82, and an abutting portion 85 extending from a free end of the second plate 84. The through hole 81 is defined in the first plate 83 of the resilient clip 80.

The pressing portion 82 has an M-shaped configuration. The pressing portion 82 includes a press surface 82a, two wings 82b slantingly and upwardly extending from two sides of the press surface 82a, and two connecting arms 82c slantingly and downwardly extending from free ends of the wings 82b. The first and second plates 83, 84 respectively extend from free ends of the connecting arms 82c. The press surface 82a is lower than the first and second plates 83, 84. Furthermore, when the resilient clip 80 is mounted to the base plate 50 with the first and second plates 83, 84 contacting with the heat absorbing plate 70 mounted in the accommodating space 53, the pressing portion 82 is deformed to exert a depressing force on the heat absorbing plate 70. In this embodiment, the connecting arms 82c slantingly and downwardly extend from the free ends of the wings 82b. Alternatively, the connecting arms 82c may perpendicularly and downwardly extend from the free ends of the wings 82b.

The abutting portion 85 has an L-shaped configuration. The abutting portion 85 includes a connecting plate 85a perpendicularly and downwardly extending from the second plate 84, and an abutting plate 85b horizontally extending from the connecting plate 85a toward a position distant from the second plate 84.

In assembly of the thermal module onto the printed circuit board, the base plate 50 is fixed to the printed circuit board via the legs 51, with the north bridge chip contacting with the middle portion of the bottom surface of the base plate 50 and received in the space formed between the base plate 50 and the printed circuit board. The abutting portion 85 of the resilient clip 80 is placed in the accommodating space 53 and adjacent to the sidewall 53b thereof. Meanwhile, the resilient clip 80 is so oriented that the first and second plates 83, 84 are substantially perpendicular to a top surface of the sidewall 53b. The evaporation section 44 of the heat pipe 40 is received in the receiving space 74 of the heat absorbing plate 70. The heat absorbing plate 70 and the evaporation section 44 of the heat pipe 40 are placed in the accommodating space 53, with the free end 45 and the bent portion 46 of the heat pipe 40 respectively received in the notches 53e, 53f of the base plate 50. The first plate 83 of the resilient clip 80 is pressed to rotate downwardly until it abuts intimately against a top surface of the sidewall 53d. In this position, the through hole 81 of the first plate 83 aligns with the mounting hole 54 of the sidewall 53d, and the abutting plate 85b of the abutting portion 85 is turned upwardly to engage with a bottom surface of the sidewall 53b. The fixing element 90 is then brought to extend through the though hole 81 of the resilient clip 80 and fit securely in the mounting hole 54 of the base plate 50, thereby mounting the resilient clip 80 to the base plate 50. Meanwhile, the press surface 82a, and the first and second plates 83, 84 intimately contact with a top surface of the heat absorbing plate 70 with a resilient deformation being generated in the pressing portion 82. The heat absorbing block 60 which is secured with the evaporation section 34 of the heat pipe 30 is placed on the CPU, and the condensation sections 32, 42 of the heat pipes 30, 40 are disposed at the air outlet 11 of the centrifugal blower 10. The heat sink 20 is placed on the condensation sections 32, 42 of the heat pipes 30, 40 and at the air outlet 11 of the centrifugal blower 10. Therefore, the thermal module is entirely mounted on the printed circuit board.

In the assembly of the thermal module and the printed circuit board, the pressing portion 82 of the resilient clip 80 deforms when the resilient clip 80 is mounted on the base plate 50 and presses the heat absorbing plate 70 to move towards the VGA card. The heat absorbing plate 70 intimately contacts with a GPU (graphics processing unit) of the VGA card, thereby to enable the heat pipe 40 to have a better thermal connection with the GPU of the VGA card.

In the present thermal module, the resilient clip 80 is formed by simply stamping a metal plate. This decreases the cost of the resilient clip 80 so that the resilient clip 80 can benefit mass production. The assembly of the resilient clip 80 is very simple, which further benefits the reduction of assembling cost of the thermal module.

Figure 5:
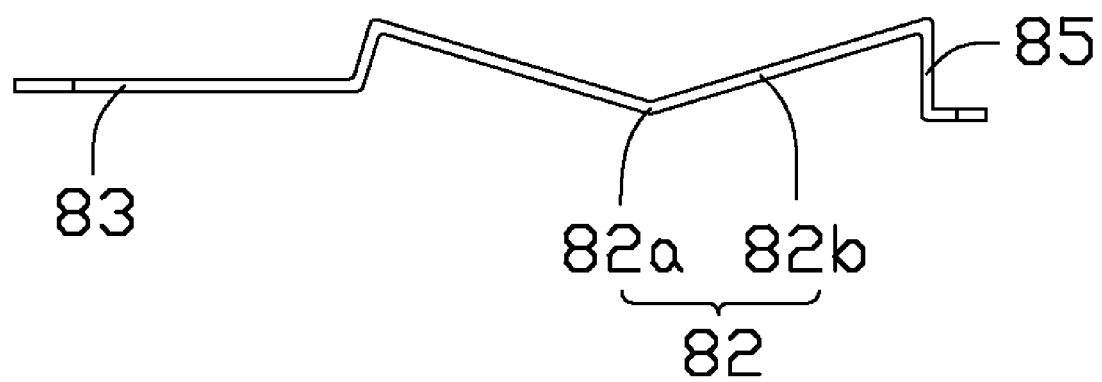
FIG. 5 is a side view of a resilient clip according to a second embodiment of the present invention.

Referring to FIG. 5, a second embodiment of the resilient clip 80 is shown. In the second embodiment, the second plate 84 and an adjacent connecting arm 82c of the first embodiment are canceled, and the abutting portion 85 directly extends from an adjacent wing 82b of the pressing portion 82. Alternatively, the connecting arm 82c adjacent to the first plate 83 can further be canceled, which results in that the first plate 83 and the abutting portion 85 directly extend from the wings 82b of the pressing portion 82, respectively.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A thermal module comprising:
   a base;
   a centrifugal blower;
   a heat sink mounted to an air outlet of the centrifugal blower;
   a heat pipe configured for connecting the heat sink with a heat generating electronic component; and
   a resilient clip configured for urging the heat pipe onto the heat generating electronic component, the resilient clip comprising a V-shaped pressing portion disposed above an evaporation section of the heat pipe, a plate portion disposed at one end of the pressing portion, configured for being fixed to the base, and an abutting portion disposed at the other end of the pressing portion and comprising an abutting plate configured for abutting against a bottom surface of the base;
   wherein the evaporation section of the heat pipe is received in a heat absorbing plate, the heat absorbing plate comprises top and bottom plates and a side plate integrally connecting the top plate with the bottom plate, and the heat pipe is received in a receiving space enclosed by the top and the bottom plates and the side plate.

2. The thermal module as described in claim 1, wherein the heat absorbing plate is received in an accommodating space defined in the base.

3. The thermal module as described in claim 1, wherein the resilient clip is made of a continuously bent metal plate.

4. The thermal module as described in claim 1, wherein the abutting portion is L-shaped in profile and comprises a connecting plate connecting the abutting plate with another portion of the resilient clip, the abutting plate perpendicularly extending from the connecting plate.

5. The thermal module as described in claim 1, wherein the resilient clip further comprises another plate portion disposed between the pressing portion and the abutting portion, the another plate portion connecting with one end of the abutting portion.

6. The thermal module as described in claim 5, wherein the another plate portion connects with the other end of the pressing portion via a connecting arm.

7. The thermal module as described in claim 1, wherein the plate portion connects with the one end of the pressing portion via a connecting arm.

8. The thermal module as described in claim 7, wherein the resilient clip further comprises another plate portion disposed between the pressing portion and the abutting portion, the another plate portion connecting with one end of the abutting portion.

9. The thermal module as described in claim 8, wherein the another plate portion connects with the other end of the pressing portion via a connecting arm.

10. A thermal module comprising:
a base plate defining an accommodating space therein;
a heat pipe having an evaporating section extending into the accommodating space, adapted for thermally connecting with a heat generating electronic component;
a heat sink thermally connecting with a condensing section of the heat pipe; and
a clip having a first end fixed to a top face of the base plate, a second end engaging with a bottom face of the base plate, and a pressing portion located between the first and second ends, the pressing portion extending into the accommodating space and urging the evaporating section of the heat pipe downwardly;
wherein the evaporation section of the heat pipe is received in a heat absorbing plate, the heat absorbing plate comprises top and bottom plates and a side plate integrally connecting the top plate with the bottom plate, and the heat pipe is received in a receiving space enclosed by the top and the bottom plates and the side plate.

11. The thermal module as described in claim 10, further comprising a blower for blowing an airflow through the heat sink.

12. The thermal module as described in claim 11, wherein the pressing portion of the clip has an M-shaped configuration.

13. The thermal module as described in claim 11, wherein the pressing portion of the clip has a V-shaped configuration.

* * * * *